Nov. 30, 1943.   H. PELPHREY   2,335,606
WORM GEAR MOUNTING
Filed Sept. 4, 1942   2 Sheets-Sheet 1

INVENTOR
Harry Pelphrey.
BY
Harness, Dickey & Pierce.
ATTORNEYS

Nov. 30, 1943. H. PELPHREY 2,335,606
WORM GEAR MOUNTING
Filed Sept. 4, 1942 2 Sheets-Sheet 2

INVENTOR
Harry Pelphrey.
BY
Harness, Dickey & Pierce.
ATTORNEYS.

Patented Nov. 30, 1943

2,335,606

UNITED STATES PATENT OFFICE 2,335,606

WORM-GEAR MOUNTING

Harry Pelphrey, Detroit, Mich., assignor to Michigan Tool Company, Detroit, Mich., a corporation of Delaware Application September 4, 1942, Serial No. 457,299

2 Claims. (Cl. 74—396)

The present invention relates to a worm gear mounting, and particularly relates to an improved mounting and assembly of a worm gear, of the globoidal or Hindley type, within a housing in mesh with a worm gear.

The primary object of the present invention is to provide a simplified construction whereby a worm gear of the type mentioned above may be readily assembled and mounted within a housing in mesh with a worm gear.

Other objects of the invention will become apparent from the following specification, the drawings relating thereto, and from the claims hereinafter set forth.

In the drawings, in which like numerals are used to designate like parts in the several views throughout:

Figure 1:
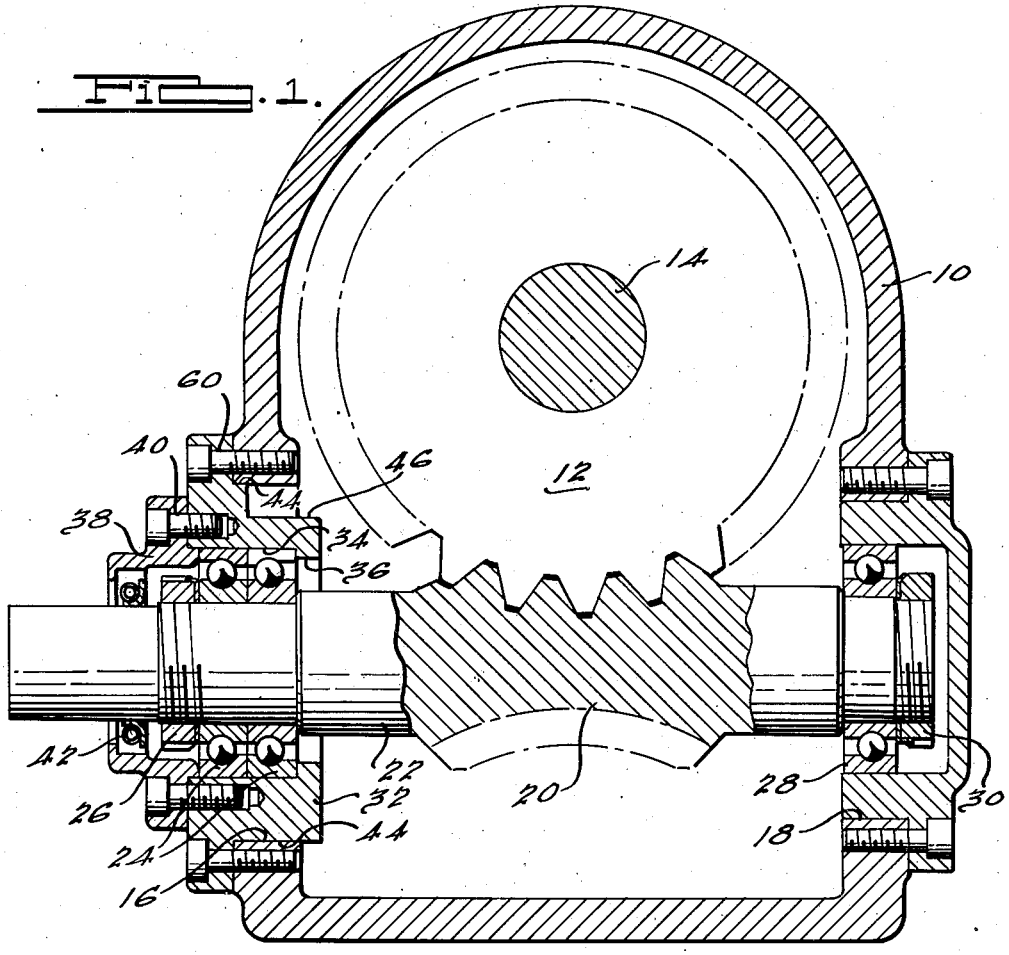
Figure 1 is a cross-sectional view showing the final assembly of the structure of the present invention with the bearing retainer turned to its operating position.
Figure 4:
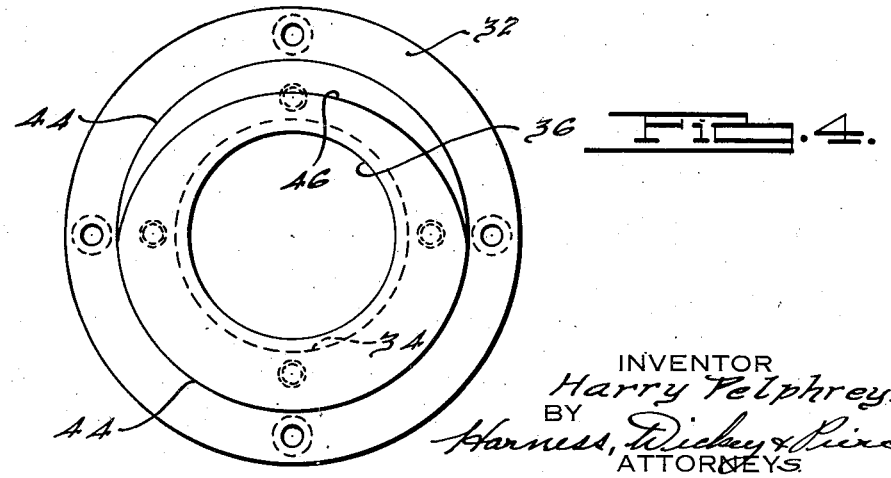
Fig. 4 is an elevational view of the bearing retainer shown in Fig. 1.

It will be appreciated that, in globoidal worm gear sets, such as those shown in Cone Patent No. 1,751,540, there is a double enveloping relationship between the worm and the gear when they are in mesh. The ends of the worm are of larger diameter than the intermediate portions thereof, so that the assembly of the worm within the housing presents a difficult problem because of the possibility of interference between the leading, large diameter end of the worm with the gear. According to the present invention, a simplified construction is provided whereby the worm and a bearing retaining member are first assembled outside of the housing, and such subassembly may then be positioned within the housing out of meshing relationship with the gear, but in such a position that the worm may be moved into meshing relationship. A bearing cap is disposed over the leading end of the subassembly, and the bearing retainer on the opposite end is then turned through 180 degrees, so that there is proper bearing contact between the retainer and the housing, and the retainer is then locked in place.

Referring to the drawings, a gear housing is indicated at 10. A worm gear 12, of the type adapted to mesh with a globoidal or Hindley type worm, is keyed to a shaft 14, which is mounted within suitable bearings in the housing 10. The housing 10 is formed with aligned apertures 16 and 18, the centers of which are aligned on an axis which is substantially on a right angle to the axis of the shaft 14.

A worm 20 of the globoidal type is adapted to be positioned within the housing 10 in mesh with the gear 12. The worm gear 20 includes the shaft 22 having one end which is adapted to project outwardly of the housing 10 for connection to driving or driven elements. Ball bearing assemblies 24 are disposed over a reduced portion of the shaft 22 with one of the inner races bearing against an annular shoulder of the shaft 22. A retainer screw 26 is threaded over a threaded portion of the shaft 22 and is adapted to bear against the inner race of the other ball bearing assembly to prevent their axial displacement with respect to the shaft 22.

Another ball bearing assembly 28 is disposed on a reduced portion of the other end of the shaft, with the inner race disposed against an annular shoulder formed on the shaft. Such ball bearing assembly is held against axial displacement by means of a nut 30, similar to the nut 26, which is threaded over a threaded portion of the shaft and which engages the opposite side of the inner race.

The worm 20, having the ball bearing assemblies mounted thereon, is assembled to a bearing retainer 32 outside of the housing 10. Such retainer 32 has a central aperture 34 therethrough which terminates in an inwardly directed annular flange 36. The outer races of the ball bearing assemblies 24 are received in the aperture 34, with the outer race of one abutting against the shoulder formed by the flange 36 and with the outer race of the other engaged by an annular flange formed on an end retainer 38. Such end retainer 38 has an axial opening therethrough through which the shaft 22 projects and is held to the retainer 32 by means of screws 40. A suitable seal 42 may be disposed within the member 38, so as to prevent oil leakage along the shaft 22.

Retainer 32 is formed with an annular, axial portion 44 which is adapted to be received within the apertures 16. Such annular portion 44 is relieved as indicated at 46 over approximately 180 degrees thereof.

Figure 2:
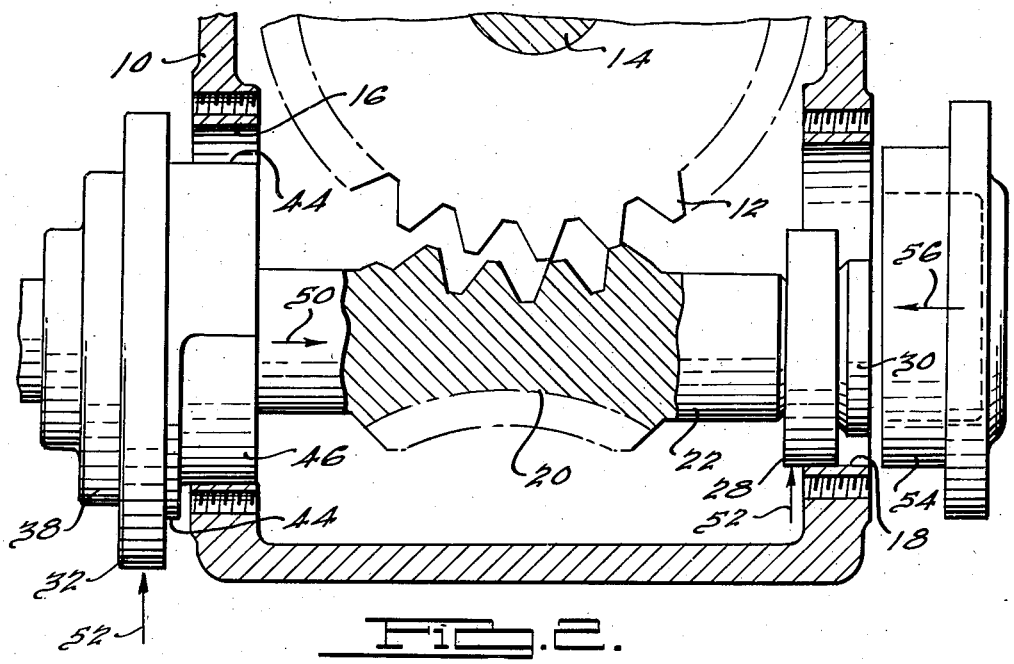
Fig. 2 is a fragmentary view similar to Fig. 1, showing the worm after the bearing and bearing retainer have been assembled outside in a position within the housing and out of meshing relationship with the worm gear.
Figure 3:
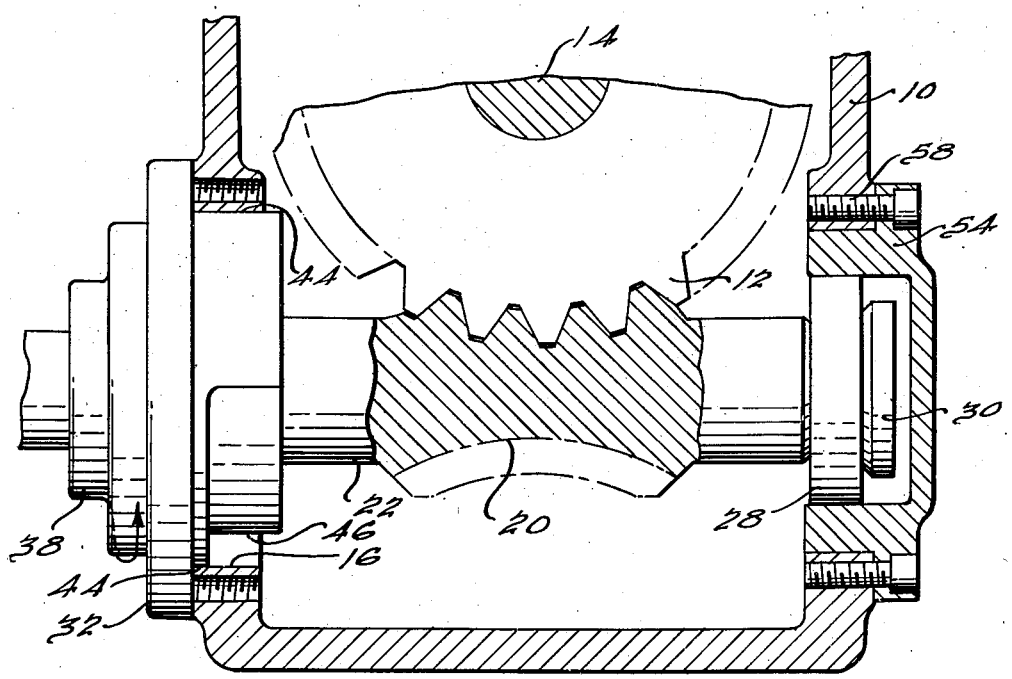
Fig. 3 is a view similar to Fig. 2, showing the worm in mesh with the gear and with both of the bearing retainers in position, but with one of the bearing retainers in the position that it assumes before being turned to the operating position shown in Fig. 1.

The sub-assembly, including the worm 20 mounted within the retainer 32, is inserted through the apertures 16 with the relieved portion 46 disposed downwardly or away from the gear 12, as shown in Fig. 2. The sub-assembly is moved in the direction of the arrow 50, so that the outer race of bearing assembly 28 seats upon the aperture 18 and the relieved portion 46 seats upon the aperture 16 away from gear 12. The worm 20 may thus be positioned out of mesh with the gear 12, in that sufficient clearance is provided between the worm 20 and the gear 12, with a slight threading action between the leading end of the thread on the worm and the gear teeth. After the sub-assembly is positioned as shown in Fig. 2, it is moved in the direction of arrows 52, toward the gear 12, so that it is in the meshing relationship shown in Fig. 3. At this time, the assembly is moved inwardly slightly so that the annular portion 44 bears against the aperture 16 completely therearound.

An end bearing cap 54 is then inserted in the direction of arrow 56 (Fig. 2), so that the bearing assembly 28 is supported within the bearing cap 54. The bearing cap 54 may then be fixed to the housing 10 by means of screws 58, which are disposed at suitable intervals around the peripheral flange of the bearing cap. After the elements are in the position shown in Fig. 3, the retainer 32 is rotated through 180 degrees, so that it is in the position shown in Fig. 1. The wide portion of the annular surface 44 then bears against that portion of the aperture 16 which faces the gear 12. It is in that direction that the separating thrust on the worm 20 is imposed so that such thrust is taken by the wide portion of surface 44. With the elements in the position shown in Fig. 1, the retainer 32 may then be fixed to the housing 10 by means of screws 60. The gear 12 and the worm 20 are then in meshing relationship for operation.

What is claimed is:

1. A worm gear mounting for worms of the globoidal type in which such worm is mounted within a housing having a worm gear rotatably mounted therein comprising, in combination, a housing having apertures therein in which the centers of such apertures are aligned on an axis at substantially a right angle to the axis of rotation of said worm gear, and means for mounting said worm within said apertures in mesh with said gear, said means comprising bearing elements mounted on the worm shaft adjacent opposite ends thereof, said bearing elements being of smaller diameter than said apertures, a rotatable retainer member mounting one of said bearing elements in one of said apertures, said rotatable member having a relieved portion so constructed that when in one position said worm may be disposed within said housing out of meshing relation with said gear and when rotated to another position said worm is moved in mesh with said gear, and a removable retainer member mounting the other of said bearings within said other aperture.

2. A worm gear mounting for worms of the globoidal type, in which such worm is mounted within a housing having a worm gear rotatably mounted therein comprising, in combination, a housing having apertures therein in which the centers of such apertures are aligned on an axis at substantially a right angle to the axis of rotation of said worm gear, and means for mounting said worm within said apertures in mesh with said gear, said means comprising bearing elements mounted on the worm shaft adjacent opposite ends thereof, said bearing elements being of smaller diameter than said apertures, a rotatable retainer member having a flange mounting one of said bearing elements in one of said apertures, said flange having a portion relieved so that when in one position said worm may be disposed within said housing out of meshing relation with said gear and when in another position said worm is in mesh with said gear with the remaining portion of said flange engaging said housing, and a removable retainer member mounting the other of said bearings within said other aperture.

HARRY PELPHREY.